United States Patent
Hsu (12)

(10) Patent No.: US 9,717,948 B1
(45) Date of Patent: Aug. 1, 2017

(54) EXERCISING DEVICE WITH ADJUSTABLE HEIGHT

(71) Applicant: Chi-Kun Hsu, Lukang Township, Changhua County (TW)

(72) Inventor: Chi-Kun Hsu, Lukang Township, Changhua County (TW)

( * ) Notice: Subject to any disclaimer, the term of this patent is extended or adjusted under 35 U.S.C. 154(b) by 0 days.

(21) Appl. No.: 15/135,593

(22) Filed: Apr. 22, 2016

(51) Int. Cl.
*A63B 21/00* (2006.01)
*A63B 23/035* (2006.01)
*A63B 23/12* (2006.01)
*F16B 7/00* (2006.01)

(52) U.S. Cl.
CPC .... *A63B 23/1236* (2013.01); *A63B 21/00047* (2013.01); *A63B 23/03516* (2013.01); *F16B 7/00* (2013.01)

(58) Field of Classification Search
CPC .... A63B 21/00047; A63B 21/068; F16B 7/00
See application file for complete search history.

(56) References Cited

U.S. PATENT DOCUMENTS

| | | | | | |
|---|---|---|---|---|---|
| 6,048,294 | A | * | 4/2000 | Formanek | A63B 21/00047 482/141 |
| 6,129,651 | A | * | 10/2000 | Denaro | A63B 21/00047 482/141 |
| 2012/0040811 | A1 | * | 2/2012 | DeTore | A63B 21/00047 482/141 |
| 2013/0217544 | A1 | * | 8/2013 | Anaya | A63B 21/1627 482/40 |
| 2015/0065321 | A1 | * | 3/2015 | Goodson | A63B 21/00047 482/142 |
| 2015/0375027 | A1 | * | 12/2015 | Neal | A63B 23/1236 482/91 |

* cited by examiner

*Primary Examiner* — Joshua Lee
*Assistant Examiner* — Jennifer M Deichl
(74) *Attorney, Agent, or Firm* — Alan D. Kamrath; Kamrath IP Lawfirm, P.A.

(57) ABSTRACT

An exercising device includes two support seats and a holding member. Each of the support seats includes a transverse bar, a first mounting tube located on the transverse bar, and a second mounting tube located on the transverse bar. An angle is defined between the first mounting tube and the second mounting tube of each of the support seats. The first mounting tube of each of the support seats has an extension length different from that of the second mounting tube. The holding member includes a grip portion and two connecting portions located at two ends of the grip portion. Each of the connecting portions of the holding member is respectively inserted into any one of the first mounting tube and the second mounting tube of each of the support seats.

7 Claims, 12 Drawing Sheets

EXERCISING DEVICE WITH ADJUSTABLE HEIGHT

BACKGROUND OF THE INVENTION

1. Field of the Invention

The present invention relates to an exercising device and, more particularly, to an exercising device to function as a push-up frame or stand.

2. Description of the Related Art

Figure 12:
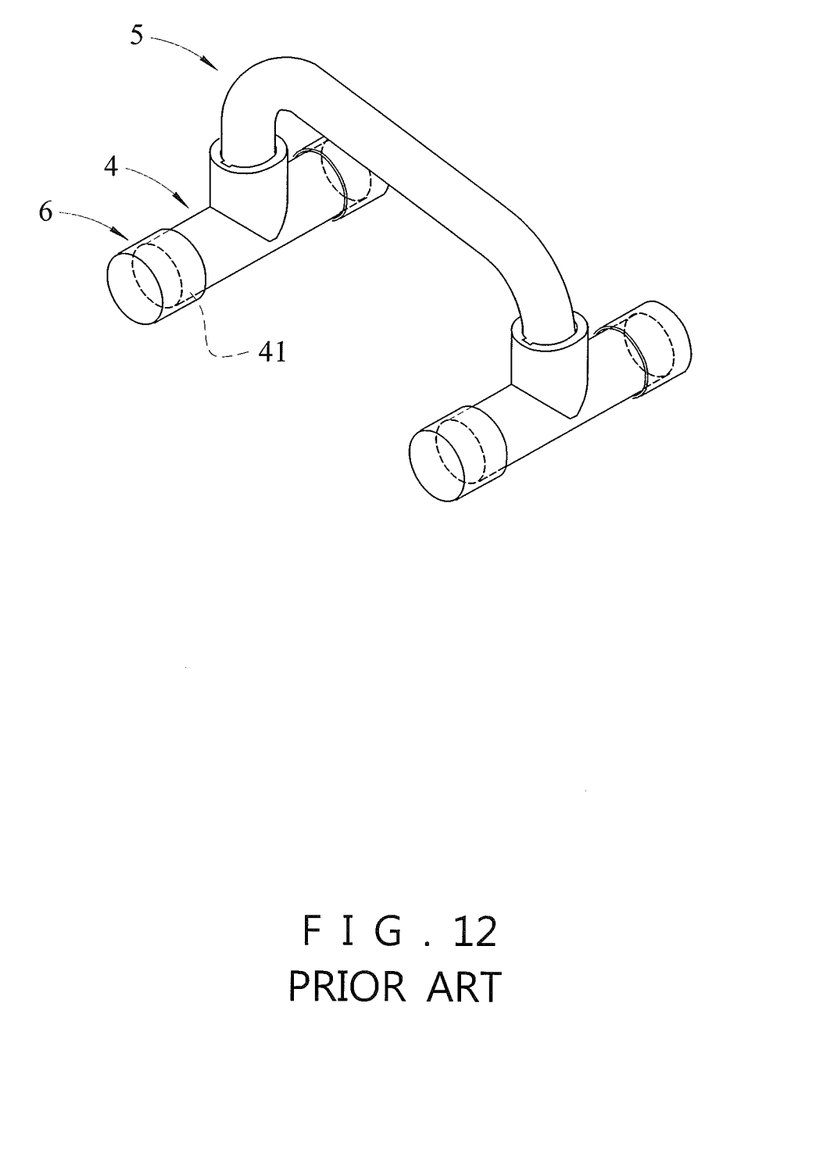
FIG. 12 is a perspective view of a conventional exercising device in accordance with the prior art.

A conventional push-up stand in accordance with the prior art shown in FIG. 12 comprises two transverse support bars 4, a substantially inverted U-shaped handle 5 having two ends secured on the two transverse support bars 4, and a plurality of end caps 6 mounted on the two transverse support bars 4. Each of the transverse support bars 4 is hollow and has two opening ends 41, and each of the end caps 6 is mounted on each of the opening ends 41 of each of the transverse support bars 4. However, the conventional push-up stand has a fixed design and cannot provide diverse training modes so that it is monotonous and tedious in use, thereby limiting the amusing effect thereof, and thereby reducing the purchase desire of the consumer.

BRIEF SUMMARY OF THE INVENTION

The primary objective of the present invention is to provide an exercising device with an adjustable height.

According to the primary advantage of the present invention, the height and inclined angle of the exercising device can be adjusted so that the exercising device has diverse training manners, thereby greatly enhancing the versatility exercising effect of the exercising device.

In accordance with the present invention, there is provided a exercising device comprising two support seats, a holding member mounted on the two support seats, and a plurality of caps mounted on the two support seats. Each of the two support seats includes a transverse bar, a first mounting tube located on an upper portion of the transverse bar, and a second mounting tube located on a side of the transverse bar. The transverse bar of each of the two support seats has an interior provided with a hollow portion and has two ends each provided with an opening. An angle is defined between the first mounting tube and the second mounting tube of each of the two support seats. The first mounting tube of each of the two support seats has an extension length different from that of the second mounting tube. The holding member includes a grip portion and two connecting portions located at two ends of the grip portion. Each of the two connecting portions of the holding member is disposed at a vertical state and is respectively inserted into any one of the first mounting tube and the second mounting tube of each of the two support seats. Each of the caps is closely fitted on the respective opening of the transverse bar of each of the two support seats.

Preferably, the first mounting tube of each of the two support seats is provided with a first slot that is connected to the hollow portion of the transverse bar, and the second mounting tube of each of the two support seats is provided with a second slot that is not connected to the hollow portion of the transverse bar. Each of the two connecting portions of the holding member is inserted into the first slot of the first mounting tube or the second slot of the second mounting tube of each of the two support seats.

Preferably, the second slot of the second mounting tube of each of the two support seats has a depth equal to a total sum of a depth of the first slot of the first mounting tube of each of the two support seats and a diameter of the hollow portion of the transverse bar.

Preferably, the first slot of the first mounting tube of each of the two support seats has a peripheral wall having two sides each provided with a first engaging section, the second slot of the second mounting tube of each of the two support seats has a peripheral wall having two sides each provided with a second engaging section, and each of the two connecting portions of the holding member has two sides each provided with a third engaging section engaging the first engaging section of the first slot of the first mounting tube or the second engaging section of the second slot of the second mounting tube of each of the two support seats.

Preferably, the first engaging section of the first slot of the first mounting tube of each of the two support seats is a first limit groove, the second engaging section of the second slot of the second mounting tube of each of the two support seats is a second limit groove, and the third engaging section of each of the two connecting portions of the holding member is a limit protrusion having two sides each provided with a plurality of arcuate positioning bosses, so that each of the two connecting portions of the holding member is closely secured in the first mounting tube or the second mounting tube of each of the two support seats.

Preferably, the grip portion of the holding member is disposed at an inclined or horizontal state between the two connecting portions.

Preferably, a soft antiskid jacket is mounted on and located at a middle position of the grip portion of the holding member.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, an exercising device in accordance with the preferred embodiment of the present invention comprises two support seats 1, a holding member 2 mounted on the two support seats 1, and a plurality of caps 3 mounted on the two support seats 1.

The two support seats 1 are juxtaposed to each other. Each of the two support seats 1 is made of plastic material and includes a transverse bar 11, a first mounting tube 12 located on an upper portion of the transverse bar 11, and a second mounting tube 13 located on a side of the transverse bar 11. The transverse bar 11 of each of the two support seats 1 has an interior provided with a hollow portion 110 and has two ends each provided with an opening 111. An angle "θ" is defined between the first mounting tube 12 and the second mounting tube 13 of each of the two support seats 1. The first mounting tube 12 of each of the two support seats 1 has an extension length different from that of the second mounting tube 13. Preferably, the transverse bar 11, the first mounting tube 12 and the second mounting tube 13 of each of the two support seats 1 are formed integrally.

The holding member 2 is made of plastic material and includes a grip portion 21 and two connecting portions 22 located at two ends of the grip portion 21. Each of the two connecting portions 22 of the holding member 2 is disposed at a vertical state and is respectively inserted into any one of the first mounting tube 12 and the second mounting tube 13 of each of the two support seats 1.

Each of the caps 3 is made of plastic or rubber material and is closely fitted on the respective opening 111 of the transverse bar 11 of each of the two support seats 1, so that the opening 111 of the transverse bar 11 of each of the two support seats 1 is disposed at a closed state.

In the preferred embodiment of the present invention, the first mounting tube 12 of each of the two support seats 1 is provided with a first slot 121 that is connected to the hollow portion 110 of the transverse bar 11, and the second mounting tube 13 of each of the two support seats 1 is provided with a second slot 131 that is not connected to the hollow portion 110 of the transverse bar 11. Each of the two connecting portions 22 of the holding member 2 is inserted into the first slot 121 of the first mounting tube 12 or the second slot 131 of the second mounting tube 13 of each of the two support seats 1.

Figure 1:
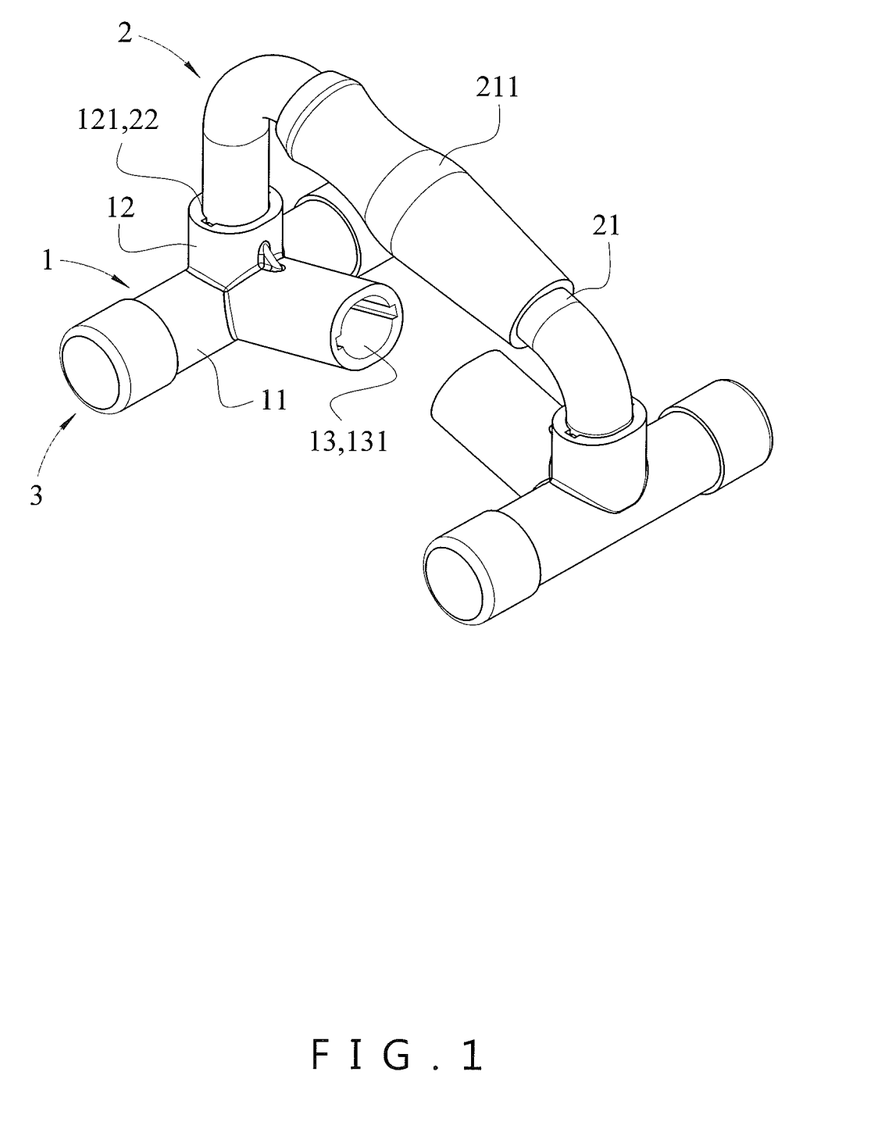
FIG. 1 is a perspective view of an exercising device in accordance with the preferred embodiment of the present invention.
Figure 2:
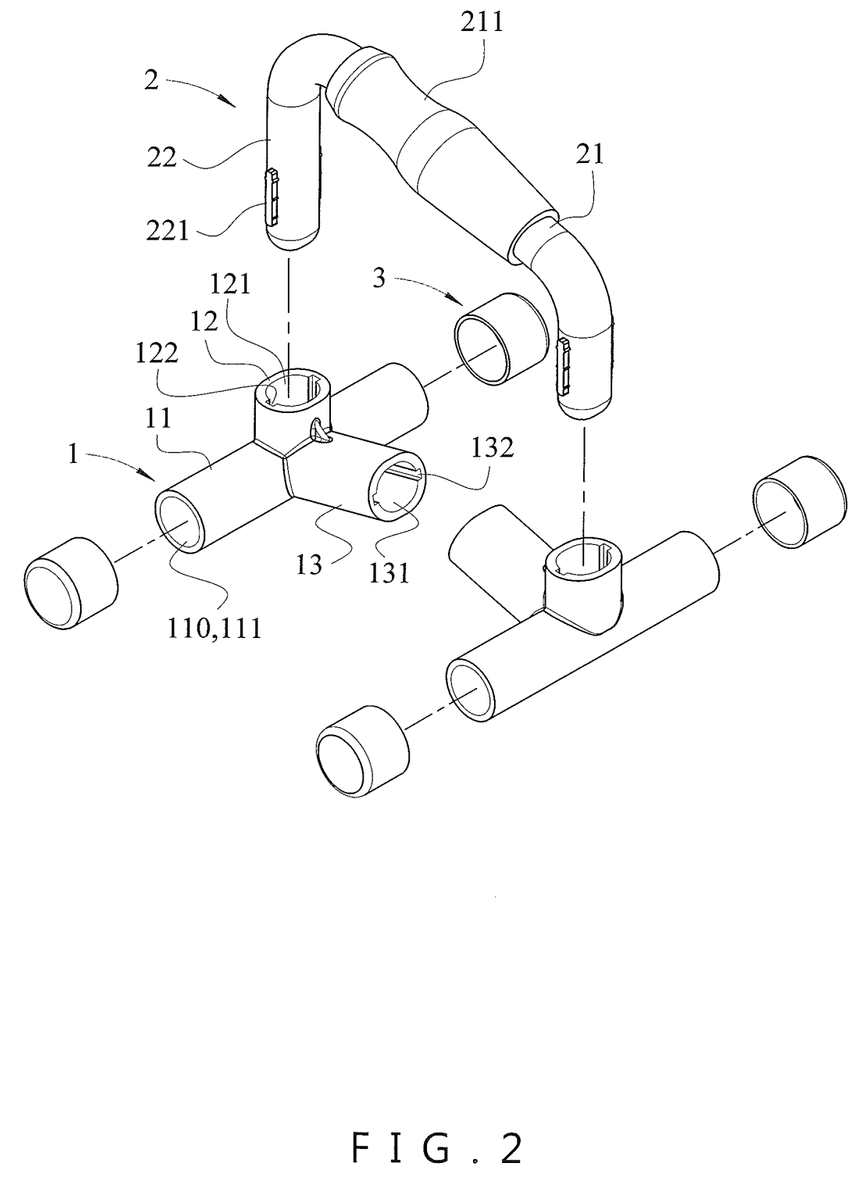
FIG. 2 is an exploded perspective view of the exercising device as shown in FIG. 1.
Figure 4:
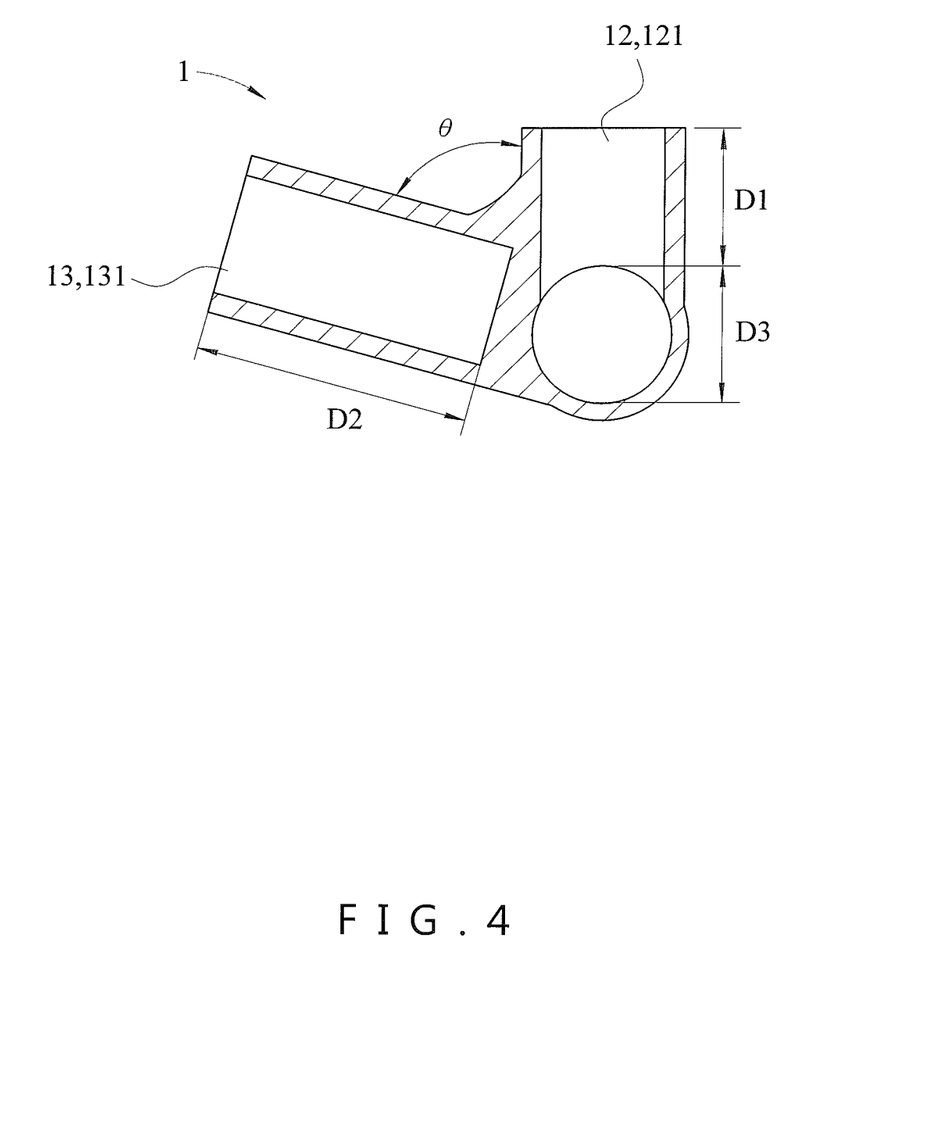
FIG. 4 is a side cross-sectional view of a support seat of the exercising device in accordance with the preferred embodiment of the present invention.
Figure 5:
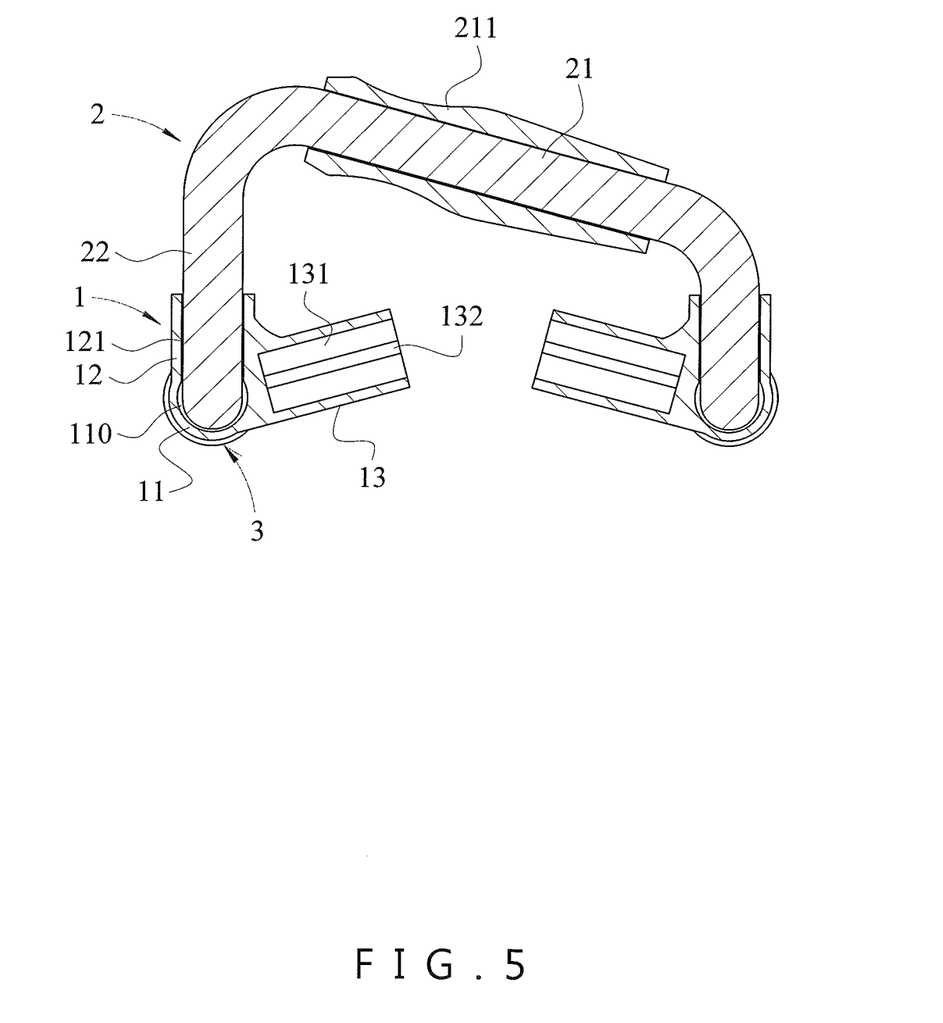
FIG. 5 is a side cross-sectional view of the exercising device as shown in FIG. 1.

In the preferred embodiment of the present invention, the second slot 131 of the second mounting tube 13 of each of the two support seats 1 has a depth "D2" equal to a total sum of a depth "D1" of the first slot 121 of the first mounting tube 12 of each of the two support seats 1 and a diameter "D3" of the hollow portion 110 of the transverse bar 11 (see FIGS. 2 and 4).

Figure 3:
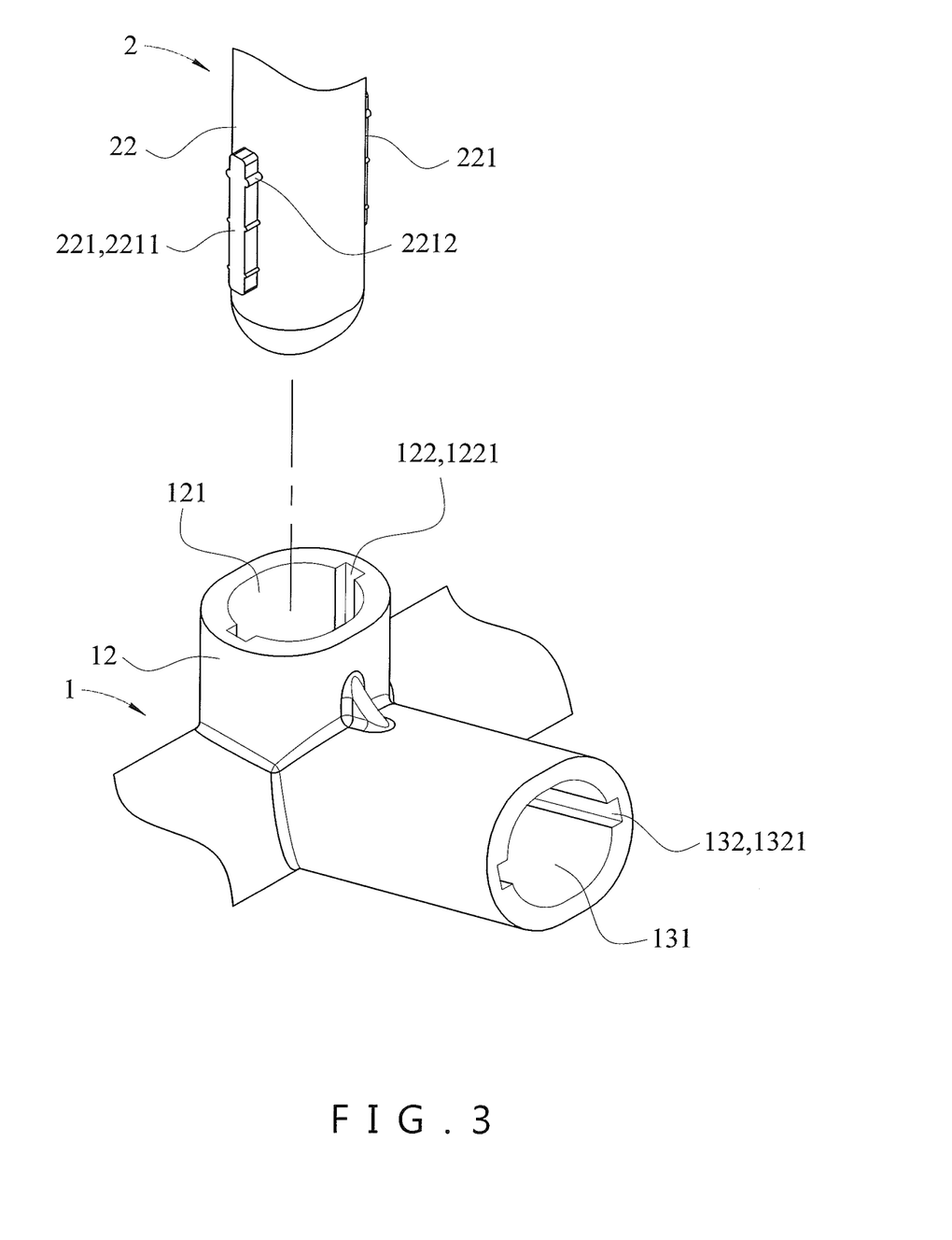
FIG. 3 is a locally enlarged view of the exercising device as shown in FIG. 2.

In the preferred embodiment of the present invention, the first slot 121 of the first mounting tube 12 of each of the two support seats 1 has a peripheral wall having two sides each provided with a first engaging section 122, the second slot 131 of the second mounting tube 13 of each of the two support seats 1 has a peripheral wall having two sides each provided with a second engaging section 132, and each of the two connecting portions 22 of the holding member 2 has two sides each provided with a third engaging section 221 engaging the first engaging section 122 of the first slot 121 of the first mounting tube 12 or the second engaging section 132 of the second slot 131 of the second mounting tube 13 of each of the two support seats 1.

In the preferred embodiment of the present invention, the first engaging section 122 of the first slot 121 of the first mounting tube 12 of each of the two support seats 1 is a first limit groove 1221, the second engaging section 132 of the second slot 131 of the second mounting tube 13 of each of the two support seats 1 is a second limit groove 1321, and the third engaging section 221 of each of the two connecting portions 22 of the holding member 2 is a limit protrusion 2211 having two sides each provided with a plurality of arcuate positioning bosses 2212, so that each of the two connecting portions 22 of the holding member 2 is closely secured in the first mounting tube 12 or the second mounting tube 13 of each of the two support seats 1 as shown in FIG. 3.

In the preferred embodiment of the present invention, the grip portion 21 of the holding member 2 is disposed at an inclined state between the two connecting portions 22, so that the two connecting portions 22 of the holding member 2 have different length. Alternatively, the grip portion 21 of the holding member 2 is disposed at a horizontal state between the two connecting portions 22, so that the two connecting portions 22 of the holding member 2 have the same length. Preferably, the grip portion 21 and the two connecting portions 22 of the holding member 2 are formed integrally. A soft antiskid jacket 211 is mounted on and located at a middle position of the grip portion 21 of the holding member 2. Preferably, the soft antiskid jacket 211 is made of foam or rubber material.

Figure 6:
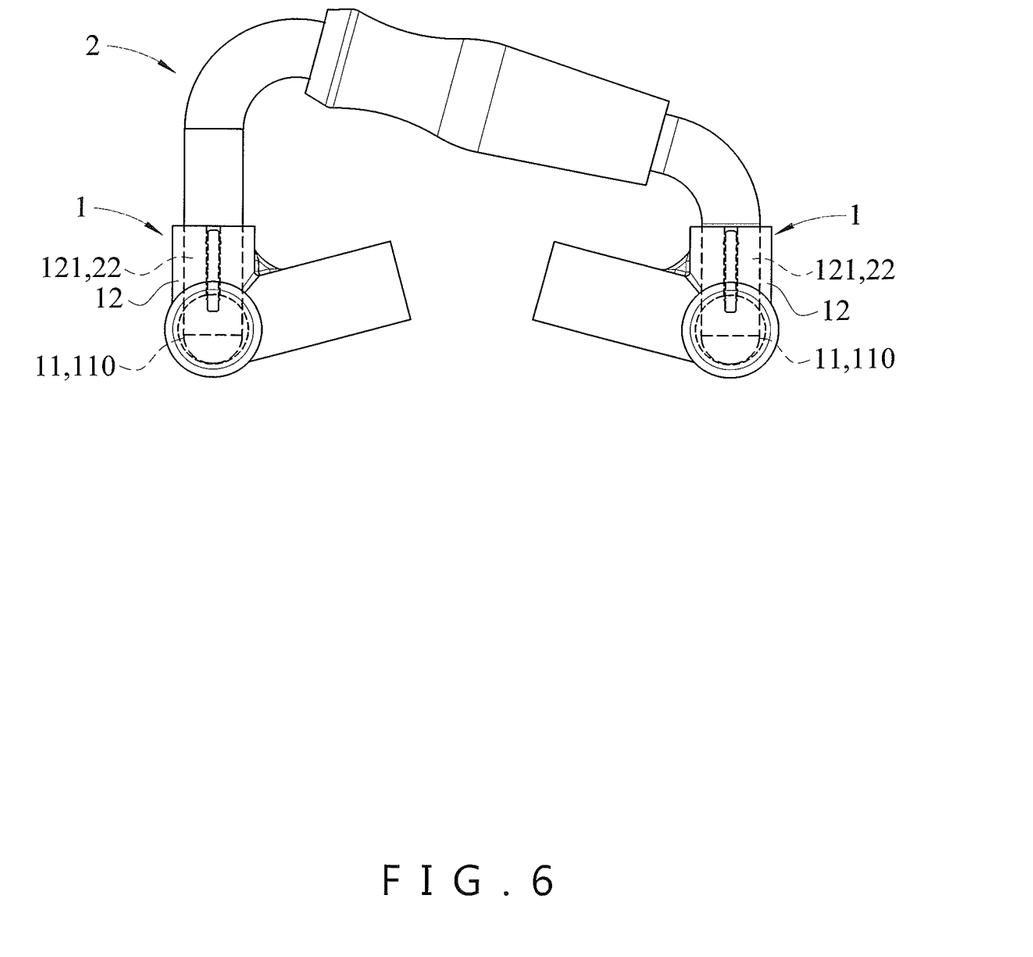
FIG. 6 is a schematic side view of the exercising device in accordance with the preferred embodiment of the present invention.

Referring to FIG. 6, each of the two connecting portions 22 of the holding member 2 is inserted into the first slot 121 of the first mounting tube 12 of each of the two support seats 1. At this time, the lower end of each of the two connecting portions 22 of the holding member 2 abuts the wall of the hollow portion 110 of the transverse bar 11 of each of the two support seats 1.

Figure 7:
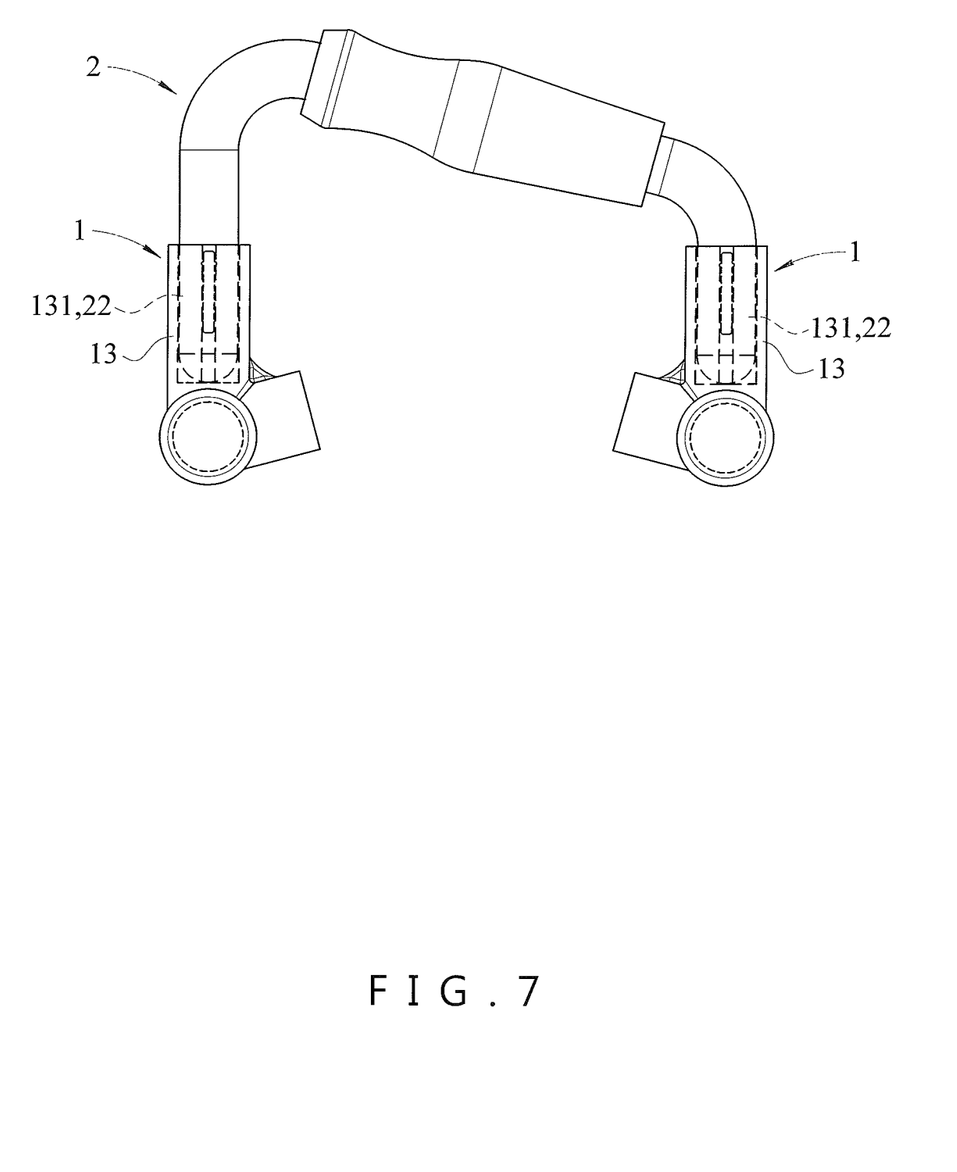
FIG. 7 is a schematic side view of the exercising device in accordance with another preferred embodiment of the present invention.

Referring to FIG. 7, each of the two connecting portions 22 of the holding member 2 is inserted into the second slot 131 of the second mounting tube 13 of each of the two support seats 1. In such a manner, In such a manner, when the holding member 2 is mounted on the two support seats 1, the whole length of the holding member 2 is increased.

Figure 8:
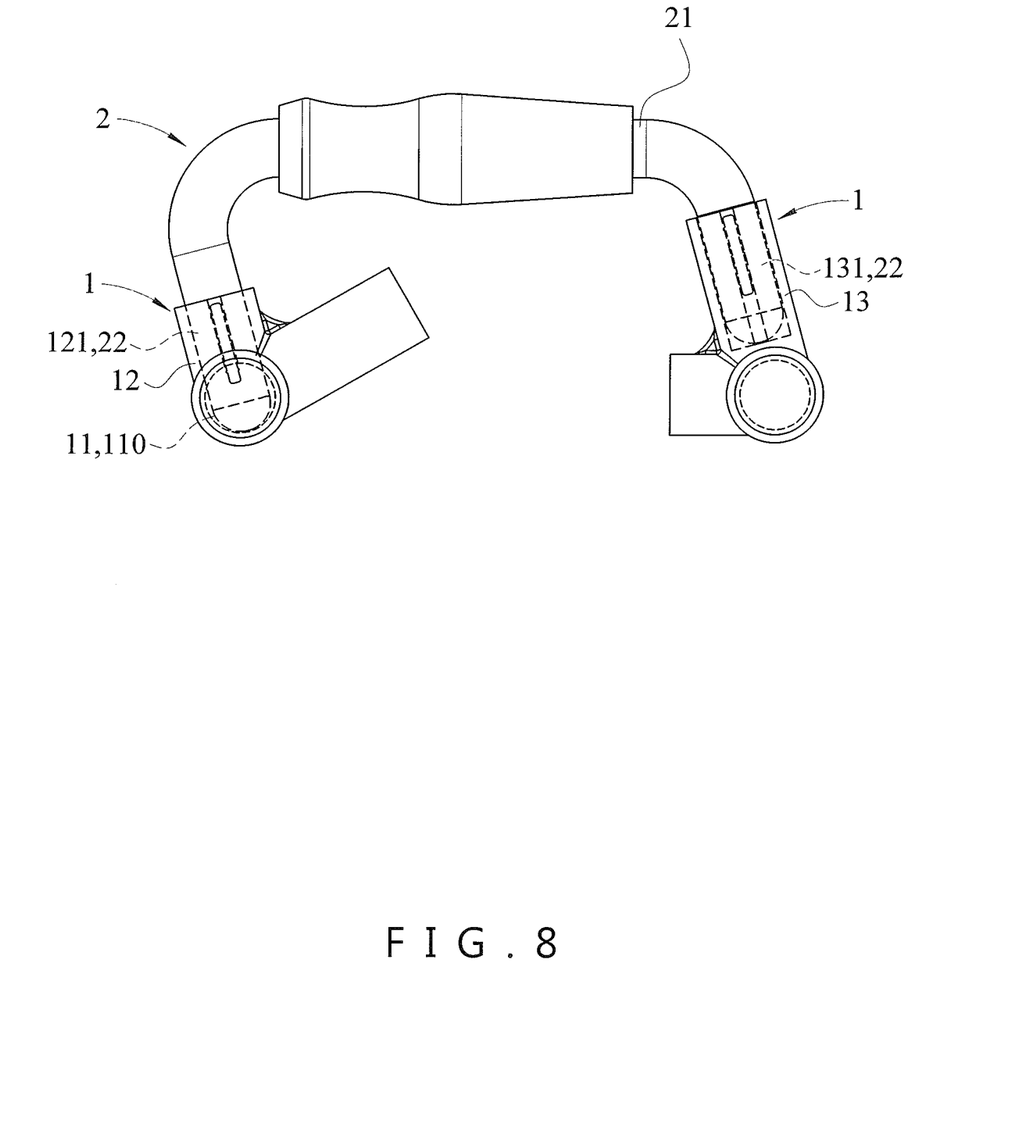
FIG. 8 is a schematic side view of the exercising device in accordance with a further preferred embodiment of the present invention.

Referring to FIG. 8, a longer one of the two connecting portions 22 of the holding member 2 is inserted into the first slot 121 of the first mounting tube 12 of one of the two support seats 1, and a shorter one of the two connecting portions 22 of the holding member 2 is inserted into the second slot 131 of the second mounting tube 13 of the other one of the two support seats 1. At this time, the lower end of the longer one of the two connecting portions 22 of the holding member 2 abuts the wall of the hollow portion 110 of the transverse bar 11 of one of the two support seats 1. In such a manner, when the holding member 2 is mounted on the two support seats 1, the grip portion 21 of the holding member 2 is disposed at a substantially horizontal state.

Figure 9:
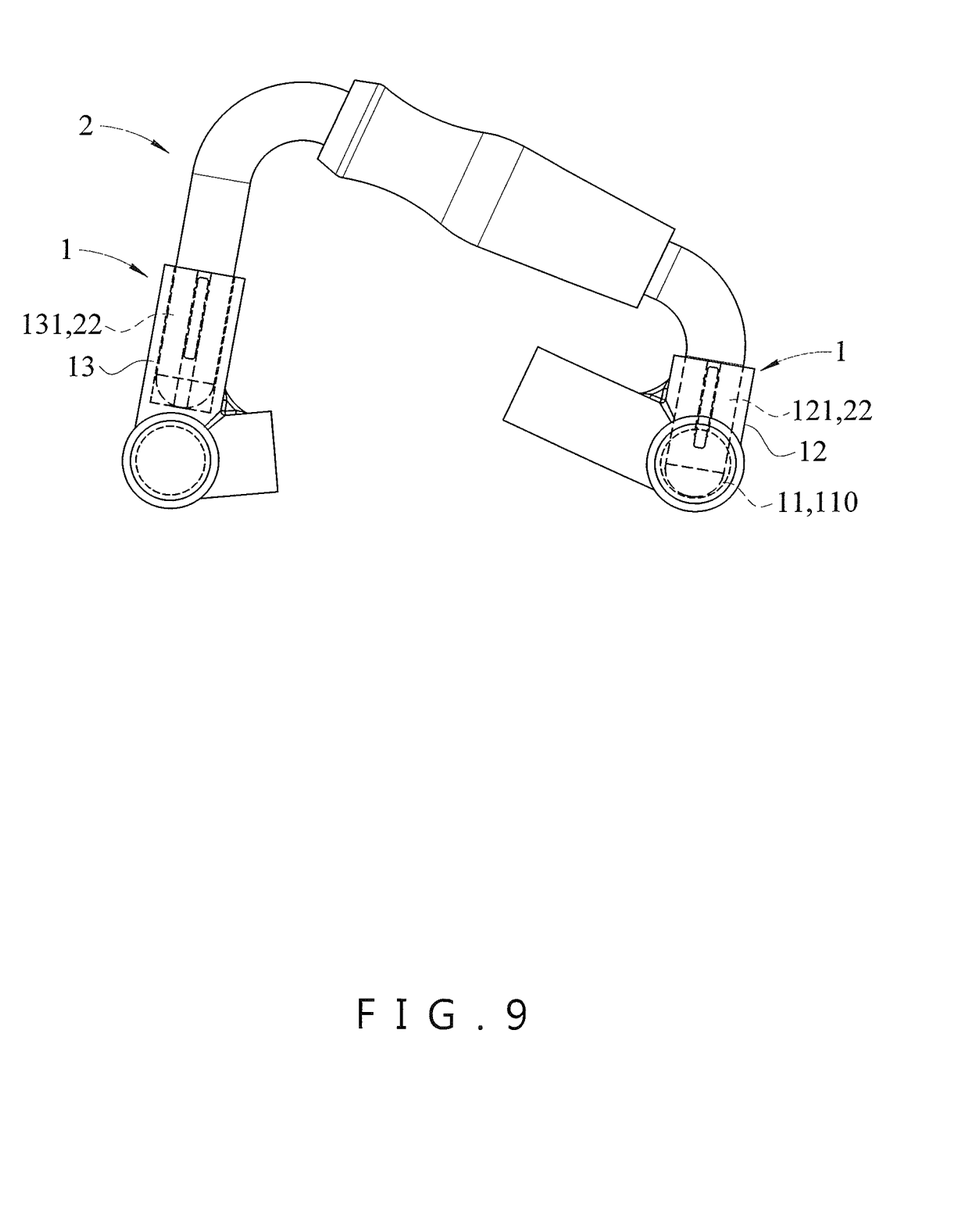
FIG. 9 is a schematic side view of the exercising device in accordance with a further preferred embodiment of the present invention.

Referring to FIG. 9, the longer one of the two connecting portions 22 of the holding member 2 is inserted into the second slot 131 of the second mounting tube 13 of one of the two support seats 1, and the shorter one of the two connecting portions 22 of the holding member 2 is inserted into the first slot 121 of the first mounting tube 12 of the other one of the two support seats 1. At this time, the lower end of the shorter one of the two connecting portions 22 of the holding member 2 abuts the wall of the hollow portion 110 of the transverse bar 11 of the other one of the two support seats 1. In such a manner, when the holding member 2 is mounted on the two support seats 1, the inclined angle of the grip portion 21 of the holding member 2 is increased.

Figure 10:
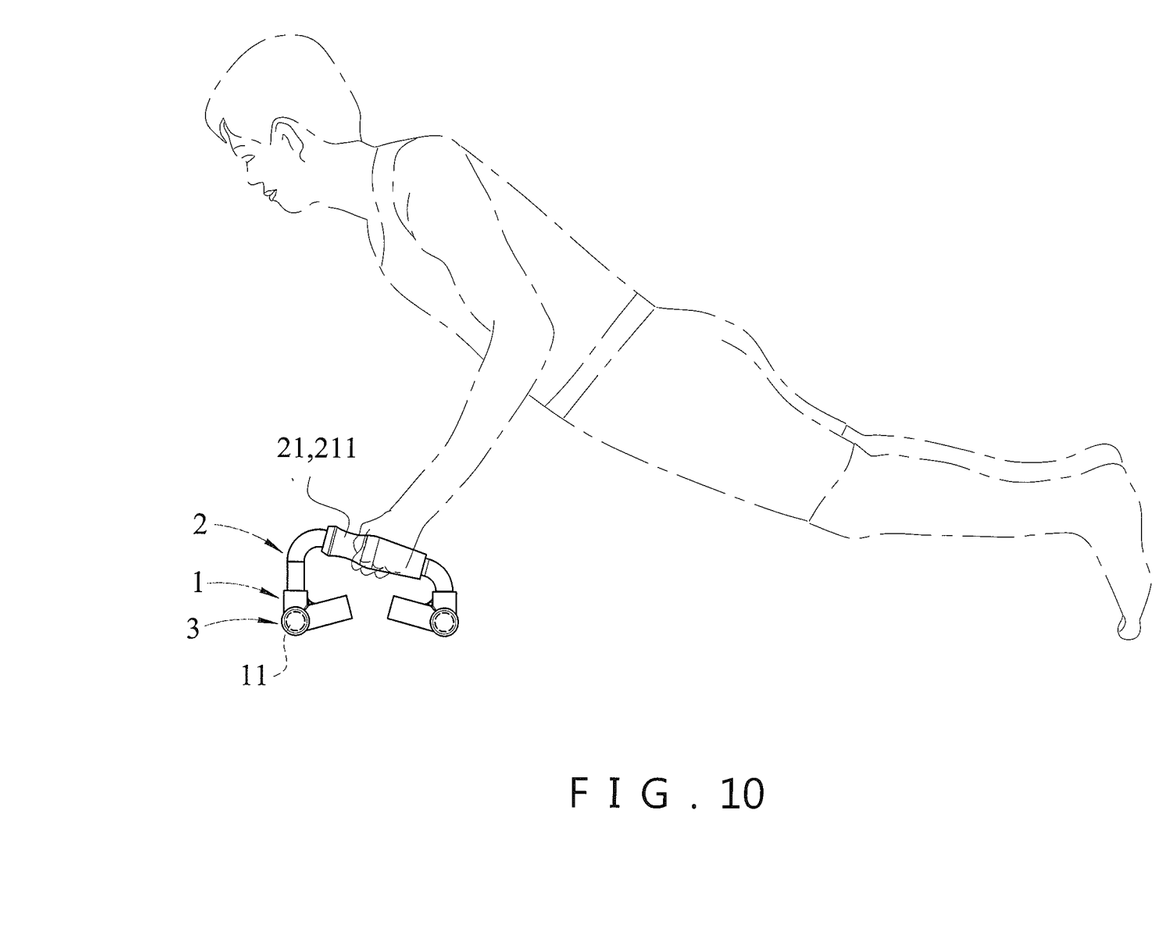
FIG. 10 is a schematic operational view of the exercising device in accordance with the preferred embodiment of the present invention.
Figure 11:
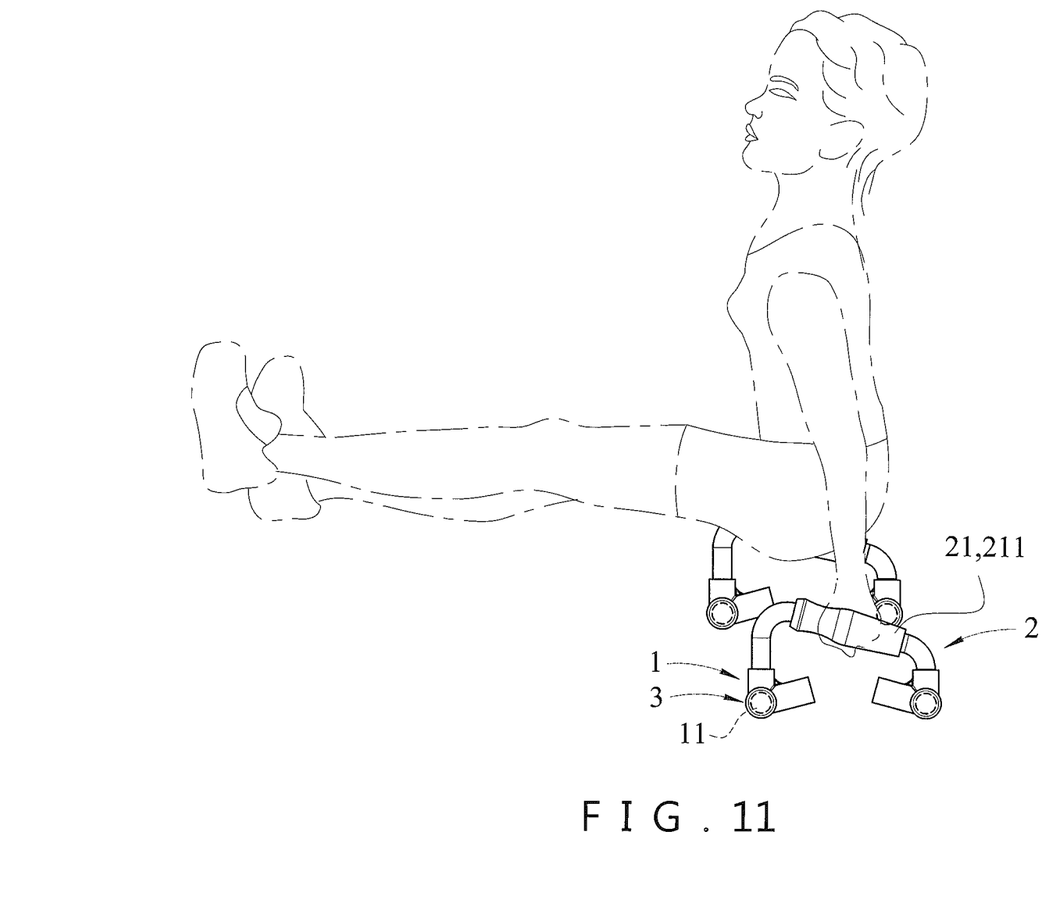
FIG. 11 is another schematic operational view of the exercising device in accordance with the preferred embodiment of the present invention.

In operation, referring to FIGS. 10 and 11 with reference to FIGS. 1-9, when the transverse bar 11 of each of the two support seats 1 is placed on the ground, a user's two hands can hold the soft antiskid jacket 211 of the grip portion 21 of the holding member 2. In such a manner, the user can use the exercising device to practice a push-up action as shown in FIG. 10 or to lift his/her body as shown in FIG. 11.

Accordingly, the height and inclined angle of the exercising device can be adjusted so that the exercising device has diverse training manners, thereby greatly enhancing the versatility exercising effect of the exercising device.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An exercising device comprising:
   two support seats;
   a holding member mounted on the two support seats; and
   a plurality of caps mounted on the two support seats;
   wherein:
   each of the two support seats includes a transverse bar, a first mounting tube located on an upper portion of the transverse bar, and a second mounting tube located on a side of the transverse bar;
   the transverse bar of each of the two support seats has an interior provided with a hollow portion and has two ends each provided with an opening;
   an angle is defined between the first mounting tube and the second mounting tube of each of the two support seats;
   the first mounting tube of each of the two support seats has an extension length different from an extension length of the second mounting tube;
   the holding member includes a grip portion and two connecting portions located at two ends of the grip portion;
   each of the two connecting portions of the holding member is disposed at a vertical state and is respectively inserted into any one of the first mounting tube and the second mounting tube of each of the two support seats; and
   each of the caps is fitted on a respective one of the openings of the transverse bar of each of the two support seats.

2. The exercising device of claim 1, wherein:
   the first mounting tube of each of the two support seats is provided with a first slot that is connected to the hollow portion of the transverse bar;
   the second mounting tube of each of the two support seats is provided with a second slot that is not connected to the hollow portion of the transverse bar; and
   each of the two connecting portions of the holding member is inserted into the first slot of the first mounting tube or the second slot of the second mounting tube of each of the two support seats.

3. The exercising device of claim 2, wherein the second slot of the second mounting tube of each of the two support seats has a depth equal to a total sum of a depth of the first slot of the first mounting tube of each of the two support seats and a diameter of the hollow portion of the transverse bar.

4. The exercising device of claim 2, wherein:
   the first slot of the first mounting tube of each of the two support seats has a peripheral wall having two sides each provided with a first engaging section;
   the second slot of the second mounting tube of each of the two support seats has a peripheral wall having two sides each provided with a second engaging section; and
   each of the two connecting portions of the holding member has two sides each provided with a third engaging section engaging the first engaging section of the first slot of the first mounting tube or the second engaging section of the second slot of the second mounting tube of each of the two support seats.

5. The exercising device of claim 4, wherein:
   the first engaging section of the first slot of the first mounting tube of each of the two support seats is a first limit groove;
   the second engaging section of the second slot of the second mounting tube of each of the two support seats is a second limit groove; and
   the third engaging section of each of the two connecting portions of the holding member is a limit protrusion having two sides each provided with a plurality of arcuate positioning bosses, wherein the limit protrusion is configured to engage the first limit groove or the second limit groove so that each of the two connecting portions of the holding member is secured in the first mounting tube or the second mounting tube of each of the two support seats.

6. The exercising device of claim 1, wherein the grip portion of the holding member is disposed at an inclined or horizontal state between the two connecting portions.

7. The exercising device of claim 6, further comprising:
   a soft antiskid jacket mounted on and located at a middle position of the grip portion of the holding member.

* * * * *